United States Patent [19]

Stockman et al.

[11] Patent Number: 5,707,427
[45] Date of Patent: Jan. 13, 1998

[54] MULTIPHASE FLUID SEPARATOR SYSTEM

[75] Inventors: Steven Miles Stockman, Friendswood; Albert Paul Richter, Jr., Houston, both of Tex.

[73] Assignee: Texaco Inc., White Plains, N.Y.

[21] Appl. No.: 49,795

[22] Filed: Apr. 21, 1993

Related U.S. Application Data

[63] Continuation-in-part of Ser. No. 770,818, Oct. 4, 1991, abandoned.

[51] Int. Cl.⁶ .................................................. B01D 19/00
[52] U.S. Cl. .................................................. 95/260; 96/206
[58] Field of Search ............................. 95/241, 254, 260, 95/262, 266; 96/186, 193, 194, 197, 198, 206, 230

[56] References Cited

U.S. PATENT DOCUMENTS

| | | | |
|---|---|---|---|
| 1,255,018 | 1/1918 | Jones | 95/260 X |
| 3,070,935 | 1/1963 | De Leon | 96/206 X |
| 3,347,096 | 10/1967 | Penson | 95/241 X |
| 3,517,487 | 6/1970 | Buvnham | 96/197 |
| 4,668,252 | 5/1987 | Gerdau | 96/197 |
| 4,853,006 | 8/1989 | Mangnall | 96/197 X |

*Primary Examiner*—Richard L. Chiesa
*Attorney, Agent, or Firm*—Henry H. Gibson; William J. Beard

[57] ABSTRACT

A system for separating multiphase fluid flow having a separator which allows the gaseous phase to separate from the oil and water phases. The separator includes a vertical component, through which the multiphase fluid rises with the fluid phases becoming annular to separate from the gaseous phase and flow to the base of the separator.

2 Claims, 3 Drawing Sheets

MULTIPHASE FLUID SEPARATOR SYSTEM

CROSS REFERENCE TO RELATED PATENT APPLICATIONS

The present application is a continuation-in-part of our earlier application Ser. No. 07/770,818 filed Oct. 4, 1991 and now abandoned.

BACKGROUND OF THE INVENTION

1. The Field of the Invention

The present invention relates to a method and apparatus for separating the gaseous phase from the liquid phases in multiphase fluid flow and in particular to a system which will achieve greater separation in a lesser amount of time and template space.

2. The Prior Art

It has long been established that there are substantial petroleum deposits located in the continental shelves throughout the world. Many techniques have been developed for subsea drilling to recover these subsea deposits. However, problems have arisen in the cost of these offshore operations and, in particular, in maintaining the various types of offshore platforms. These platforms are extremely expensive to own and operate and cannot be situated immediately above each and every well. Therefore, it is by far the preferred arrangement to have production facilities located on platforms so located as to service a number of wells and/or fields in an array about the platform. Even in this type of situation, there is the problem of transporting the three-phase fluids coming from the wells at the various well sites, or collector sites, to a processing platform.

There is a certain amount of energy, in the form of fluid pressure, that is available at the wellhead and which can be used to propel a three-phase fluid through the pipes to a production facility, but this pressure, obviously, will dissipate with time and distance. Also, in part because of subsea temperatures, there can be a buildup of condensates on the walls of the pipes thereby restricting fluid flow. Therefore, in order to be able to move three-phase fluids over substantial distances, it becomes necessary to provide means for boosting or regenerating transporting pressure.

Because these operations are taking place in a marine environment, many of the heretofore known methods and apparatus are not available such as, for example, merely in placing a three-phase pump in the pipeline. First of all, such a multiphase pump for subsea operation would be very expensive to construct and second, it must have a source of energy in order to operate.

The problems of subsea transmission of multiphase flow of hydrocarbons are recognized in U.S. Pat. Nos. 4,705,114 and 4,793,418, for example. Neither of these discharged systems incorporates separation of one phase to facilitate transportation of the entire hydrocarbon produced. U.S. Pat. Nos. 5,117,908 and 5,149,344 recognize the advantages which can be obtained by separating phases but utilize unnecessarily complex horizontally disposed separators.

SUMMARY OF THE INVENTION

The present invention concerns a method and apparatus which is particularly useful in subsea pipelines transporting three-phase fluid. At least one station in the pipeline where separation of at least one phase of the fluid occurs bypassing the three phase fluid upwardly through a vertical riser having an array of elongated vertical slots about its wall. The separated fluid can be sent to separate transportation pipes or pressure boosted and recombined into a single transportation pipe.

BRIEF DESCRIPTION OF THE DRAWINGS

The present invention will now be described by way of example with reference to the accompanying drawings wherein.

DETAILED DESCRIPTION OF THE PRESENT INVENTION

The present invention is a system for separation of three-phase (gas, oil and water) fluids. The invention is shown and described in a separation station in a subsea pipeline between a well or a collecting station and a production facility. This allows the gas phase to be separated from the oil/water phases so that each can be efficiently pumped over some distance, for example, 10 to 30 miles to either another booster station, the shore or to a production platform. The present invention is simple in principle and its operation substantially automatic.

Figure 1:
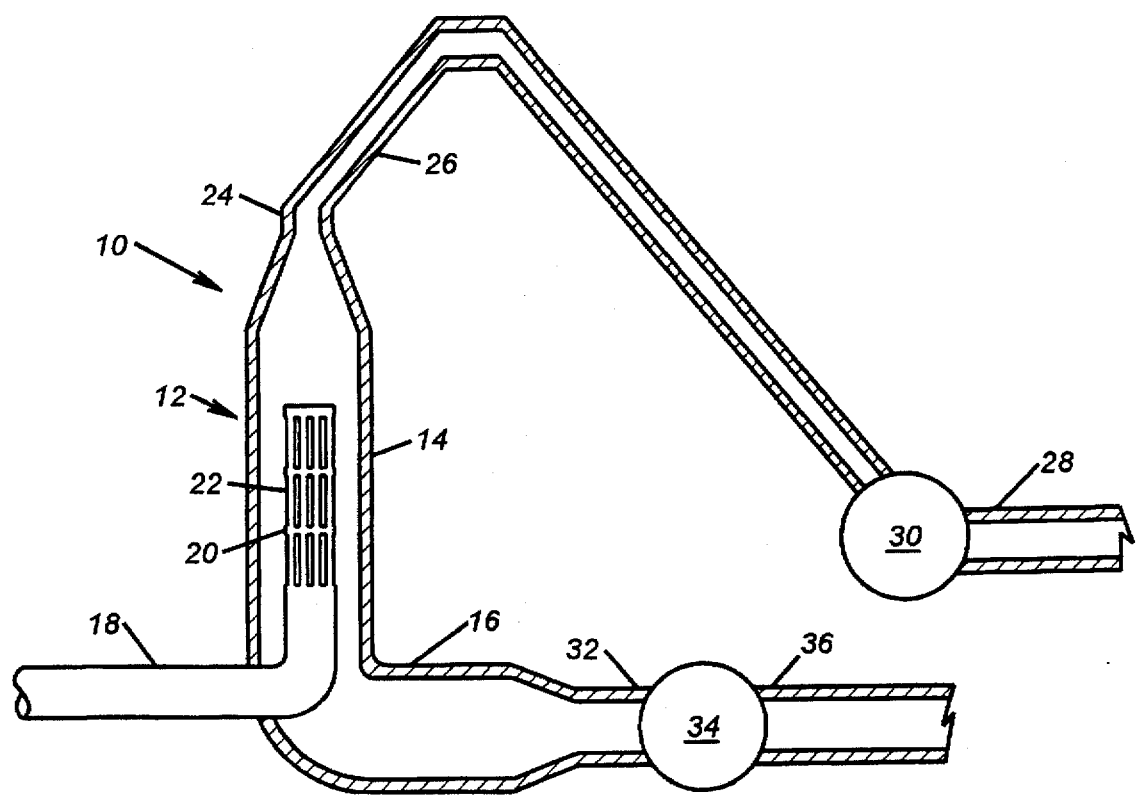
FIG. 1 is a side elevation, partially in vertical section, showing a preferred embodiment of the subject invention.

Turning first to FIG. 1, the booster station 10 of the present invention has a riser assembly 12 which is generally L-shaped with a vertical separation shell 14 and a horizontal collection shell 16. A production pipe 18 enters the riser assembly 12 near a bottom corner thereof through conventional fittings (not shown). An extended separation portion 20 of the pipe rises substantially vertically and coaxially within the vertical separation shell 14 of the riser assembly 12. This separation portion 20 of the production pipe 18 is provided with a patterned array of preferably elongated vertical slots 22 about the periphery thereof (see FIG. 2). The upper end of the riser assembly 12 forms a gas outlet 24 which is connected to a gas pipe 26 which is in turn connected to gas transportation pipe 28 through a pressure boost means 30.

The horizontal collection shell 16 of riser assembly 12 has an exit pipe 32 connected to a liquid pump 34 which is connected to the continuing liquid production pipe 36. The height of the riser pipe assembly 12 and the pipe 20 therein should, in any case, be sufficient to allow near complete separation of the produced gas from the produced multiphase liquid.

In operation, the three-phase fluid (not shown) is introduced to the assembly 12 through the production pipe 18. As the three phase fluid passes upwardly through the vertical separation pipe 20, the multiphase flow will either be bubble flow, slug flow, annular-slug transition flow or annular flow containing mist. Each of these flow patterns are shown pictorially in FIGS. 3A to 3D, respectively. The flow pattern within the vertical pipe is primarily a function of the liquid velocity and the gas velocity. In all cases however, the walls of the separator pipe will be liquid wet; therefore, adding the slots 22 to this vertical separator pipe 20 allows the liquid to be removed from the main liquid flow stream. Once the liquid passes through these slots into the annular space between the vertical separator pipe 20 and the vertical separator shell 14, the hydraulic head produced will drive the liquids out of collector shell 16. The gas continues to rise upward through the separator shell 14 and exits the separator through the gas outlet port 24.

Figure 3D:
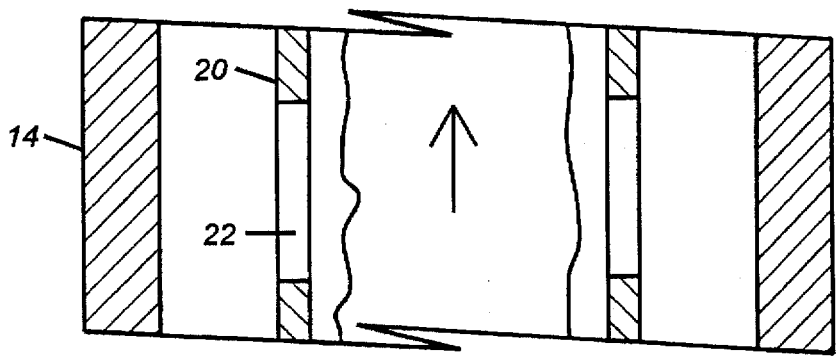
FIGS. 3A to 3D are vertical schematic sections diagrammatically illustrating the various multiphase flow patterns in the separator portion of the present invention.
Figure 3C:
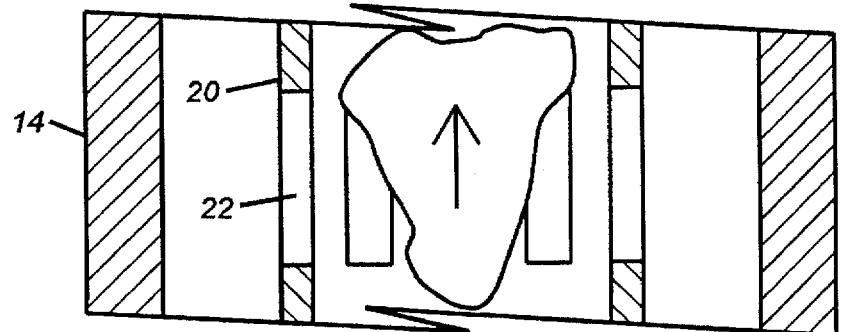
Figure 3B:
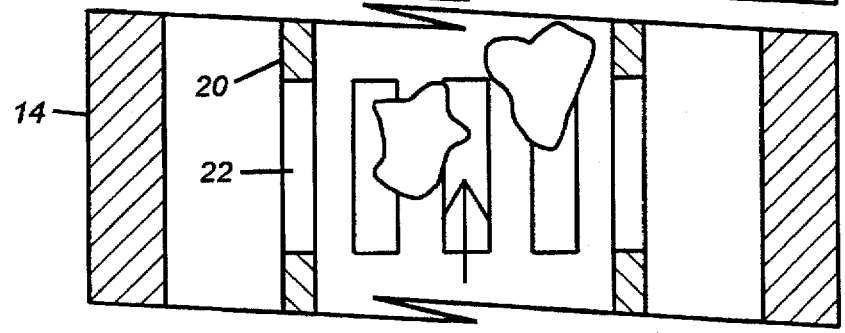
Figure 3A:
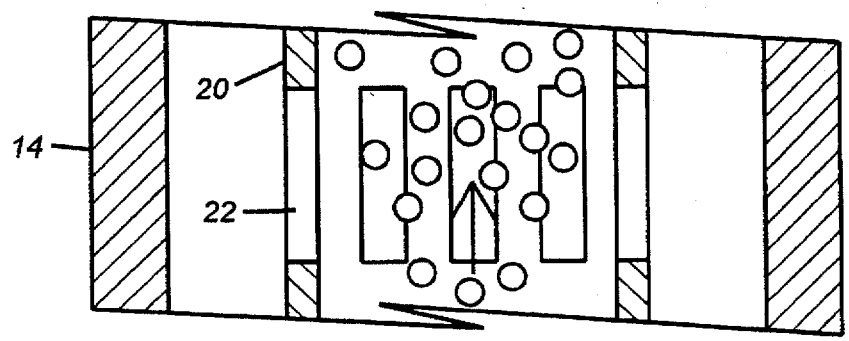

The initial flow pattern entering the separator pipe 20 will likely be the bubble flow shown in FIG. 3A; however, since liquid will be removed all along the vertical separator pipe 20, the flow pattern will progress through slug flow to annular flow (see FIGS. 3A to D) which will give the best flow of liquid through the slots 22 and thus the best gas-liquid separation. Therefore, the diameter of separator pipe 20 is selected to insure annular flow based upon the flow rate of the gas. Likewise, the diameter of the outer separator shell 14 and the height of the riser assembly 12 are determined by the flow rate of the liquids and the physical properties of the liquids.

Figure 2:
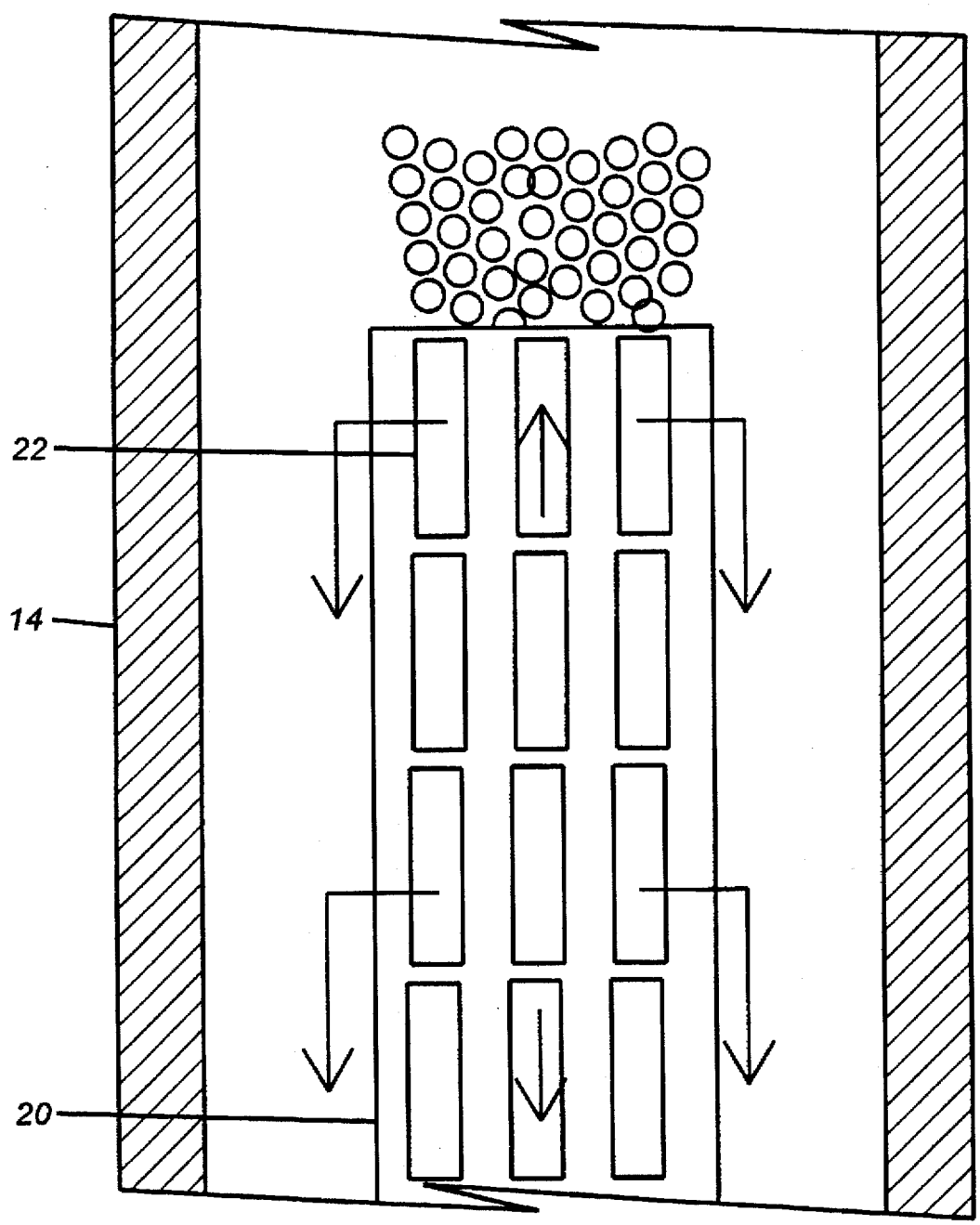
FIG. 2 is an enlarged detailed side elevation, in partial vertical section, showing a portion of the separator of the subject invention.

As shown in FIG. 2, the separator pipe 20 of the riser assembly 12 is provided about its entire circumference with a patterned array of, preferably, elongated vertically extending slots 22. Four aligned arrays of substantially equal size slots have been illustrated in FIG. 2 with liquid being forced through the slots all along the separator pipe 20 to flow downward to the collector 16 while the gas rises upwardly toward port 24, as noted by the appositely directed arrows. Staggered arrays and slots of differing sizes and shapes could also be used. The gas will continue on up the riser, however the liquids will fill the collector, and a portion of the separator, by virtue of its increased density of the water and oil. The pump 34 can be of a simpler design since it is pumping only the two-phases fluid of oil and water.

The present invention may be subject to many modifications and changes without departing from the spirit or essential characteristics thereof. Therefore the present embodiment should be considered in all respects as illustrative and not restrictive of the present invention as defined by the appended claims.

We claim:

1. An apparatus for separating three-phase fluid into its gaseous and liquid phases comprising:

a riser assembly having joined vertical and horizontal components;

input pipe means entering said riser assembly near the base of said vertical component;

separator means having a cylindrical member mounted substantially concentrically within said vertical component and extending at least partially up the vertical component defining an annular chamber therebetween, said input pipe connected to a lower end of said cylindrical member; and means defining a plurality of slots in patterned array towards an upper end of said cylindrical member whereby fluid flow regime causes the liquid phase to separate from the gaseous phases and exit said separator means as the three phases pass upwardly through said separator means whereby gas separated from said three-phase fluid is collected at the upper end of said riser assembly and the liquid phases of said three-phase fluid are collected in the horizontal component.

2. A method for separating a three-phase fluid into gaseous and liquid phases comprising the steps of:

providing a riser assembly having a vertical component extending upwardly from a horizontal component;

providing input pipe means entering said riser assembly near the level of said horizontal component;

providing separator means having a cylindrical member mounted in said vertical component with a lower end connected to said input pipe means, said cylindrical member extending substantially concentrically at least partially up the vertical component of said riser assembly to define an annular chamber therebetween, said cylindrical member having a plurality of slots in patterned array towards an upper end thereof;

passing the multiphase fluid through said separator means;

allowing the fluid flow regime to cause the liquid phase to move radially outwardly, separating from the gaseous phase, and flow from said separator means and fall to said horizontal component for collection; and collecting the gas phase as it exits the upper end of said separator means.

\* \* \* \* \*